United States Patent [19]

Chico

[11] Patent Number: 5,727,664
[45] Date of Patent: Mar. 17, 1998

[54] BRAKING DEVICE FOR ELEVATION GIMBALS

[75] Inventor: Francisco Guillen Chico, Sax, Spain

[73] Assignee: Forjas del Vinalopo. S.L., Spain

[21] Appl. No.: 554,495

[22] Filed: Nov. 7, 1995

[30] Foreign Application Priority Data

Nov. 8, 1994 [ES] Spain ..................... 9402841

[51] Int. Cl.$^6$ ................. F16F 9/00; E06B 9/56
[52] U.S. Cl. ................. 188/382; 74/89.14; 160/300
[58] Field of Search .................. 188/382, 265, 188/82.3, 82.7, 82.1; 74/440, 89.14; 192/8 R; 160/300, 301, 302, 309

[56] References Cited

U.S. PATENT DOCUMENTS

| | | | |
|---|---|---|---|
| 1,420,151 | 6/1922 | Sauvage | 188/382 X |
| 1,472,382 | 11/1923 | Bayles et al. | 188/265 X |
| 3,398,590 | 8/1968 | Campbell et al. | 74/89.14 |
| 5,570,606 | 11/1996 | Irie | 74/89.14 |

FOREIGN PATENT DOCUMENTS 2 457 370  12/1980  France .
2 554 158  5/1985  France .

*Primary Examiner*—Peter M. Poon
*Attorney, Agent, or Firm*—Bacon & Thomas

[57] ABSTRACT

A locking device for a roller blind gimbal includes a drive worm gear meshed with a crown gear to which a roller blind is coupled, and a pair of pinion gears meshed to the crown gear for co-rotation therewith, the pinion gears having locking openings in their hubs engageable by a locking element that is spring biased towards the locking openings when they are aligned in a locking position. The locking position of the openings is periodically reached by rotation of the crown gear and pinion gears in a blind raising direction. Release of the locking element is obtained by rotating a driving worm gear in a blind lowering direction to release the engagement between the locking element and the hub openings in the pinion gears. When the locking openings in the pinion gears re-align at the predetermined blind raised position, the spring biases the locking element into engagement with the openings to lock the pinion gears against co-rotation and setting the locking element into position relative to the worm gear to prevent reverse rotation of the crown gear.

4 Claims, 3 Drawing Sheets

BRAKING DEVICE FOR ELEVATION GIMBALS

BACKGROUND OF THE INVENTION

1. Field of the Invention

The current invention relates to a braking device applicable to a gimbal of the type used to control window roller blinds, particularly to a braking device used to lock the roller blind at its uppermost position.

2. Description of the Prior Art

A number of different braking devices are used in gimbal type devices for window roller blinds.

Some of these devices use a worm screw actuated by a crank handle, the worm screw being geared to a crown gear to which the roller blind rotational axis is attached.

The use of retaining means applicable to the turning mechanism gear is seen in the case of another utility model owned by the applicant, in which there are some strips attached to the side surface of two of the teeth of each one of the toothed wheels making up the gear, so that at the end of a given number of turns of the mechanism both strips are coupled together so that any backwards movement is then prevented.

In the other case, the user turns a crank handle until he notices the crank handle turning resistance in the gear wheel strip joining (locking) position. If the crank handle is turned further while in this locked position, the toothed wheels tend to pull apart from each other producing wear upon their supporting elements and thus tend to overload their housing, progressively causing wear that tends to increase as the effort applied becomes larger.

The need to obtain a braking device with a greater level of reliability and less wear, acting directly upon the force transferring spindle rather than upon the gears, is an object of the invention described below.

SUMMARY OF THE INVENTION

The elevation gimbal braking device herein described consists of a locking strip that establishes, in the braking or locking position, an attachment between a spindle in the form of a worm screw and two upper pinions meshing with a crown gear of the device, wherein both said worm screw and said pinions are fitted with a peripheral locking slot and locking openings respectively, in which the locking strip is in the braking or locked position.

The locking strip is kept under tension by the action of a spring, so that it is permanently biased in contact with the perimeter surface of the pinion hub while it is turning. The retaining strip is introduced into the openings after a given number of turns, such number coinciding with the greater number of teeth of the two pinions that mesh with the crown gear.

In order to enable the coincidence between the openings of said pinions, at the end of a predetermined number of turns, one of the pinions has one tooth more than the other one.

One end of the locking strip engages the opening in the pinions and the other one engages the spindle slot.

In order to get the assembly to unlock, an operator crank handle is turned in the opposite direction, pressing the bottom of the spindle slot upon the inclined lower edge of the interlocking strip, lifting the strip, thereby placing the spring under tension, raising and unlocking the strip from the pinion openings.

BRIEF DESCRIPTION OF THE DRAWINGS

In order to complement the description and as an aid to a better understanding of the characteristics of the invention, this patent specification includes, as an integral part thereof, a set of drawings for purely illustrative but not limitative purposes wherein.

DESCRIPTION OF THE PREFERRED EMBODIMENT

Figure 1:
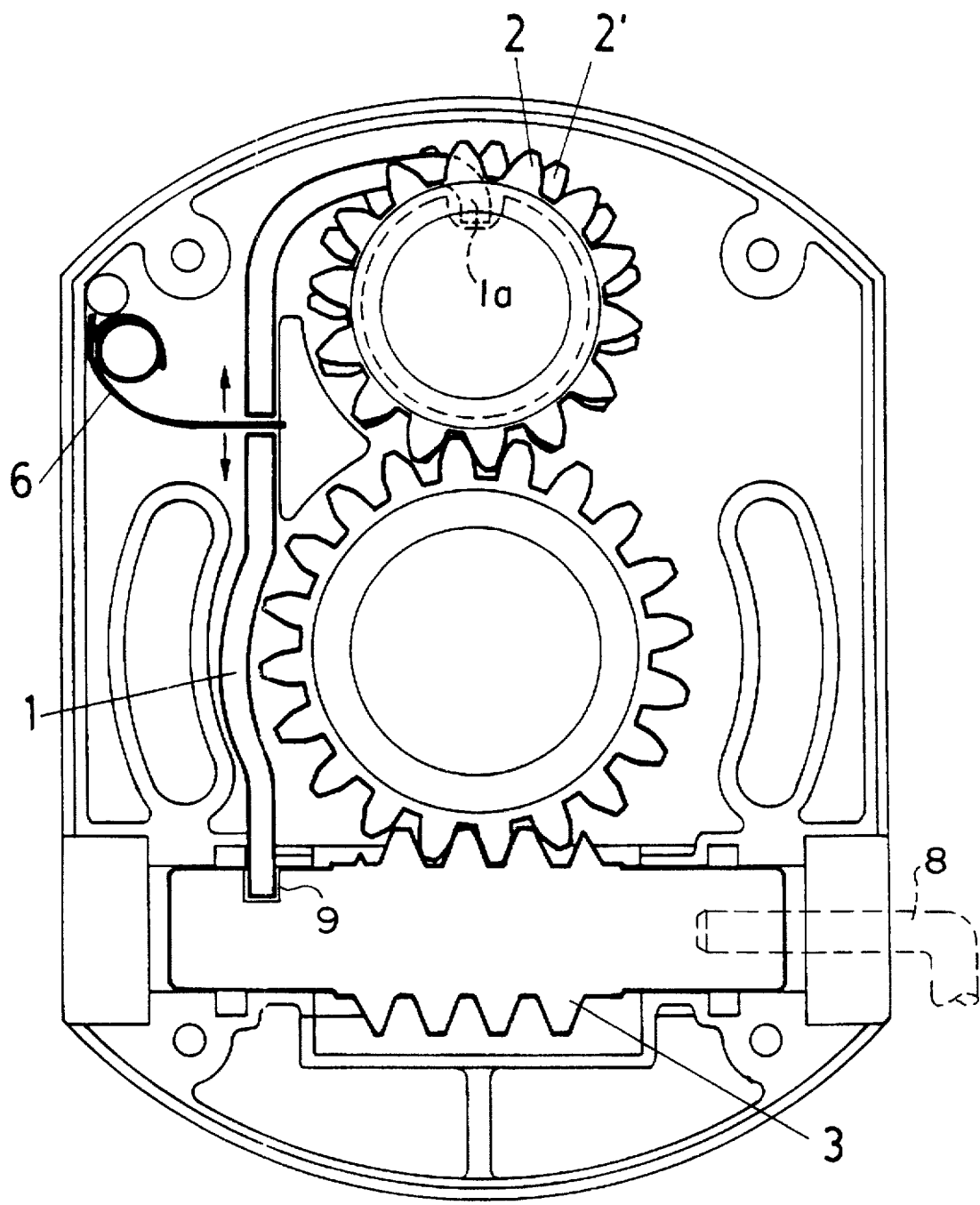
FIG. 1. Shows a view of the elevation gimbal with the locking strip in the locked position.

On observing the figures, it may be seen that the braking device for elevation gimbals has a locking strip 1 of curved winding shape, that extends upwards forming a locking hook 1a which is in contact with or engages the perimeter surface of two upper pinions 2, 2', both incorporating a hub where openings 4, 4' are provided and which are located opposite each other or apart until a crank handle 8 engaging worm gear 3 rotates a given number of turns equal to the number needed to position the roller blind at a raised position.

The lower end 7 of the locking strip 1 fits into a slot 9 located on a spindle in the form of a worm screw or pinion 3 in the locked position.

The pinions 2, 2' are arranged at the upper position, next to each other and both are meshed with the crown gear 5 that is actuated by the worm screw 3. One of the pinions 2' incorporates one tooth more than the other pinion 2, thus ensuring the coincidence of the openings 4, 4' after a number of turns which is equal to the number of teeth on the pinion with the greater number of teeth.

Figure 2:
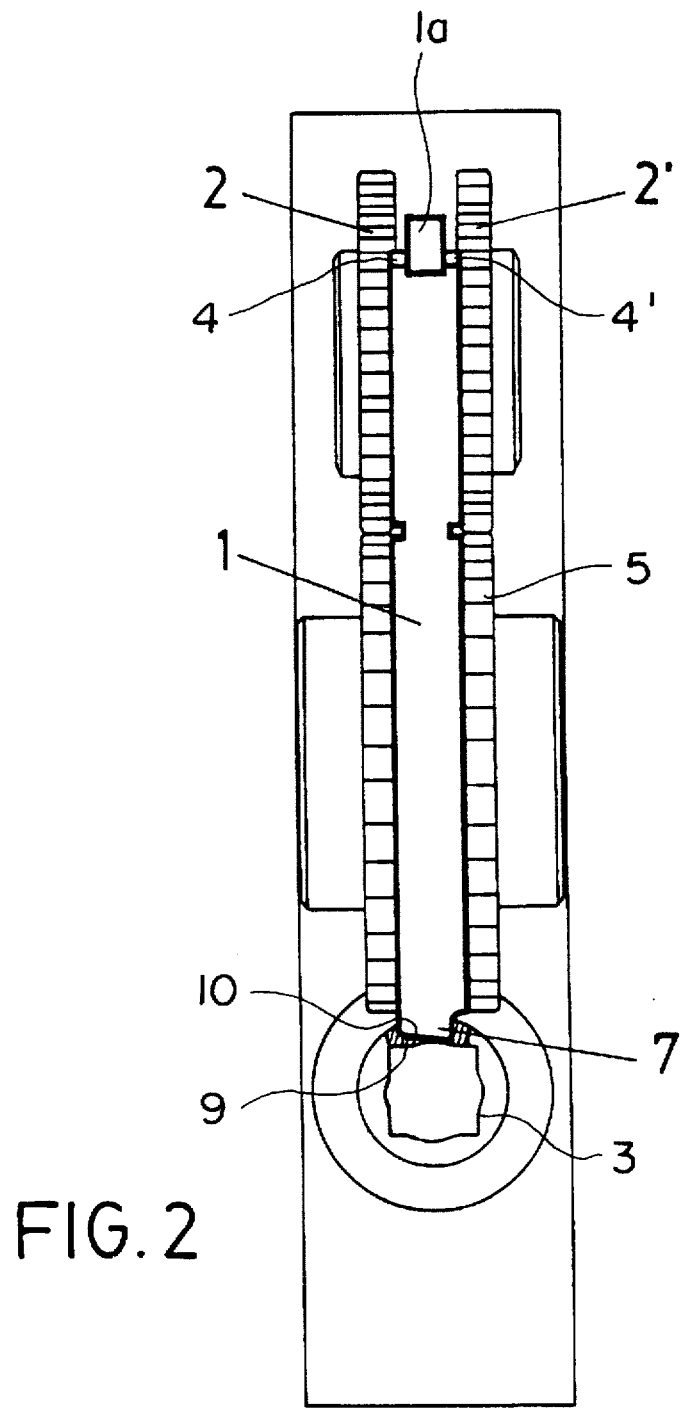
FIG. 2. Shows a side view of the locking strip in the locked position.
Figure 3:
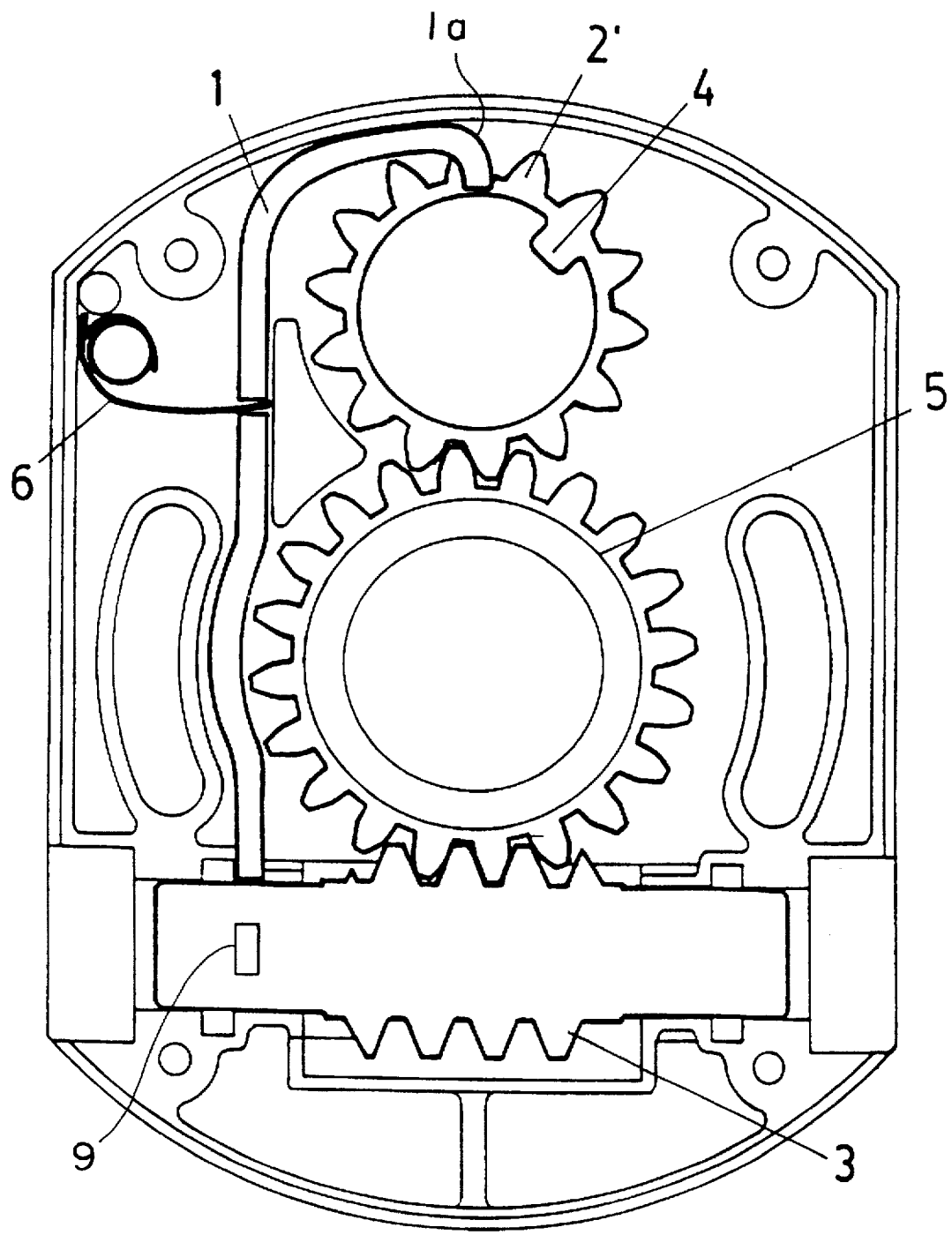
FIG. 3. Shows a view of the elevation gimbal with the locking strip in the unlocked position, showing only one of the pinions.

During the movement of the pinions 2, 2' the locking strip 1 is biased by the action of a spring 6 that engages the strip transversely. The strip 1 is in contact at its upper end 1a with the perimeter of the pinion hubs, as may be observed in FIG. 3, coupling into the openings 4, 4' of the pinions 2, 2' only when the openings 4, 4' coincide at the single location shown in FIG. 2.

In order to unlock the locking strip 1, crank handle 8 is rotated in the opposite direction, pressing the bottom surface of the rectangular spindle slot 9 upon the inclined surface 10 of lower edge 7 of the strip 1, lifting it and unlocking it from the spindle slot 9 and from the pinion openings 4, 4'.

It is not considered necessary to extend this description any further to enable any expert in the art to understand the scope of the invention and the advantages derived therefrom.

The materials, shape, size and arrangement of the elements may be varied as long as said variation does not alter the essential features of the invention.

The terms in which this specification has been described must always be interpreted in a wide and non limitative sense.

I claim:

1. A locking device for a roller blind gimbal including a drive worm gear meshed with a crown gear to which a roller blind is coupled, comprising:

a pair of pinion gears meshed to the crown gear for co-rotation therewith, said pinion gears including respective hubs and locking openings in said hubs, and said pinion gears having a different number of teeth meshing with said crown gear, said locking openings being disposed at a locking position when the pinion gears have co-rotated to a locking position upon rotation of said worm and crown gears a predetermined number of rotations in a blind raising direction;

said worm gear including a peripheral lock actuating slot;

a locking strip extending between the worm gear lock actuating slot and said locking openings of said pinion gears when the worm gear and pinion gears are in their respective locked positions;

a spring biasing device for urging the locking strip towards engagement with said lock actuating slot in the worm gear and the hubs of said pinion gears, said strip under the influence of the biasing device engaging the hub locking openings and locking the pinion gears together against co-rotation when the hub locking openings are in locking position and the locking strip is located at the lock actuating slot of the worm gear;

said worm gear lock actuating slot, upon displacement away from the locking strip position by rotation of the worm gear being arranged so as to move said locking strip into an unlocked position out of the slot and out of engagement with the pinion gear hub locking openings.

2. The locking device according to claim 1, wherein one of said pinion gears has one tooth more than the other pinion gear.

3. The locking device according to claim 1, wherein said lock actuating openings of said pinion gears lie adjacent each other in the locking position and said locking strip includes a single element engaging both said locking openings when they are in their locking positions.

4. The locking device according to claim 1, wherein said locking slot has a bottom and said locking strip includes an inclined lower edge engaging the bottom of said locking slot, the bottom of the locking slot cooperating with said lower edge when the worm gear is rotated in a direction to drive the crown gear in a blind lowering direction away from the locked position to thereby lift the locking strip out of engagement with said slot and said locking openings against the bias of the spring device.

* * * * *